United States Patent [19]
Lillbacka et al.

[11] Patent Number: 5,802,906
[45] Date of Patent: Sep. 8, 1998

[54] MACHINE USED FOR FOLDING, PROFILING AND CUTTING METAL SHEETS

[75] Inventors: Jorma Juhani Lillbacka, Kauhava, Finland; Roberto De Rossi; Luigi Patuzzi, both of Cologna Veneta, Italy

[73] Assignee: Finn-Power Italia Srl, Brescia, Italy

[21] Appl. No.: 644,861

[22] Filed: May 10, 1996

[51] Int. Cl.⁶ .............. B21D 5/02; B21D 5/16; B21D 28/00
[52] U.S. Cl. .................. 72/294; 72/306; 72/323
[58] Field of Search .............. 72/306, 319, 294, 72/447, 323, 322

[56] References Cited

U.S. PATENT DOCUMENTS

| | | | |
|---|---|---|---|
| 1,192,797 | 7/1916 | Salmon | 72/294 |
| 3,731,514 | 5/1973 | Deibele | 72/306 |
| 3,967,487 | 7/1976 | Stout | 72/306 |
| 4,713,957 | 12/1987 | Eder | 72/319 |
| 5,404,739 | 4/1995 | George | 72/294 |
| 5,582,053 | 12/1996 | Chubb | 72/294 |

FOREIGN PATENT DOCUMENTS

| | | | |
|---|---|---|---|
| 34520 | 2/1989 | Japan | 72/306 |
| 197014 | 8/1989 | Japan | 72/306 |
| 190925 | 7/1992 | Japan | 72/306 |

*Primary Examiner*—Daniel C. Crane
*Attorney, Agent, or Firm*—Pollock, Vande Sande & Priddy

[57] ABSTRACT

Machine used for folding, profiling and cutting metal sheets includes a fixed support structure (1) holding a lower presser element (3), on which the sheet (4) rests, and an associated upper mobile presser element (5). Together, the presser elements (3, 5) keep the sheet (4) pressed in a proper horizontal plane. The machine further includes a mobile structure (7) having a C-shaped cross section which defines a channel (2) of longitudinal orientation. This C-shaped structure holds a pair of holding blades (8–9) which perform the folding of the sheet (4) when the same C-shaped structure is raised and lowered or made to advance or withdraw with respect to the sheet (4). In the interior of the channel (2) at least one removable tool holding group (10–11) is situated. This permits repositioning of the tool holding group along the longitudinal course of the channel (2). The tools used are provided for the execution of profiling and/or cutting operations on the sheet (4) held in position by the upper (5) and lower (3) presser elements.

19 Claims, 4 Drawing Sheets

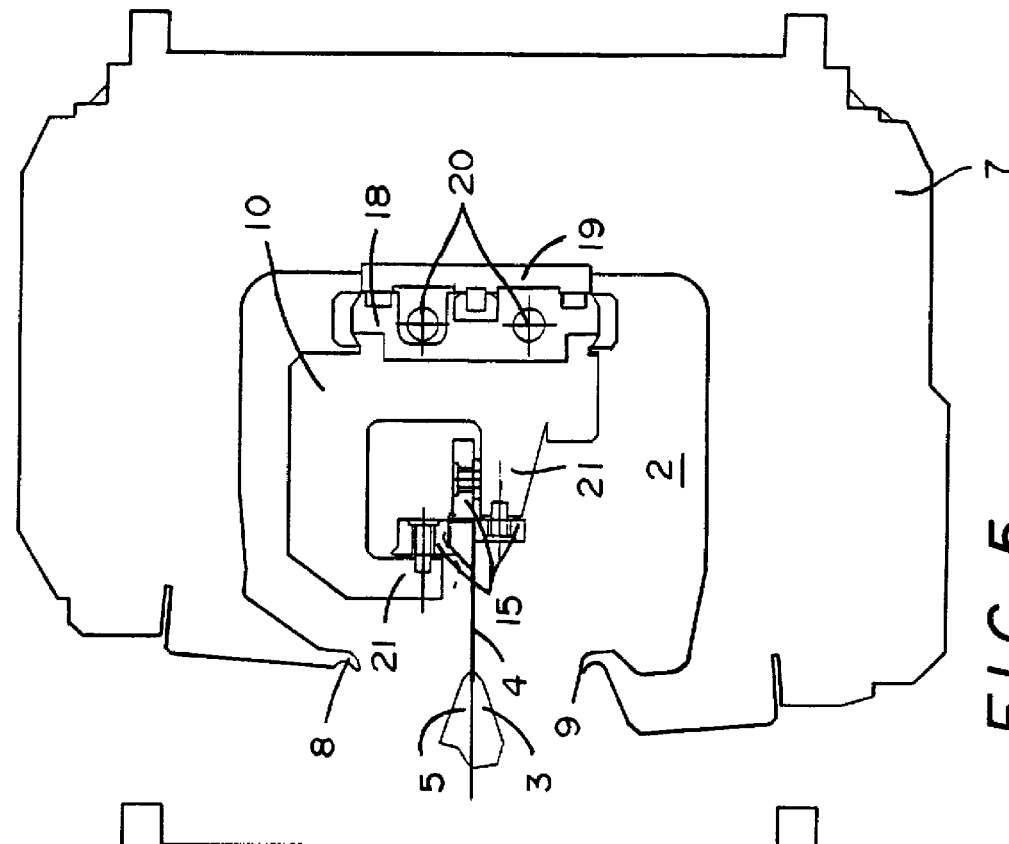
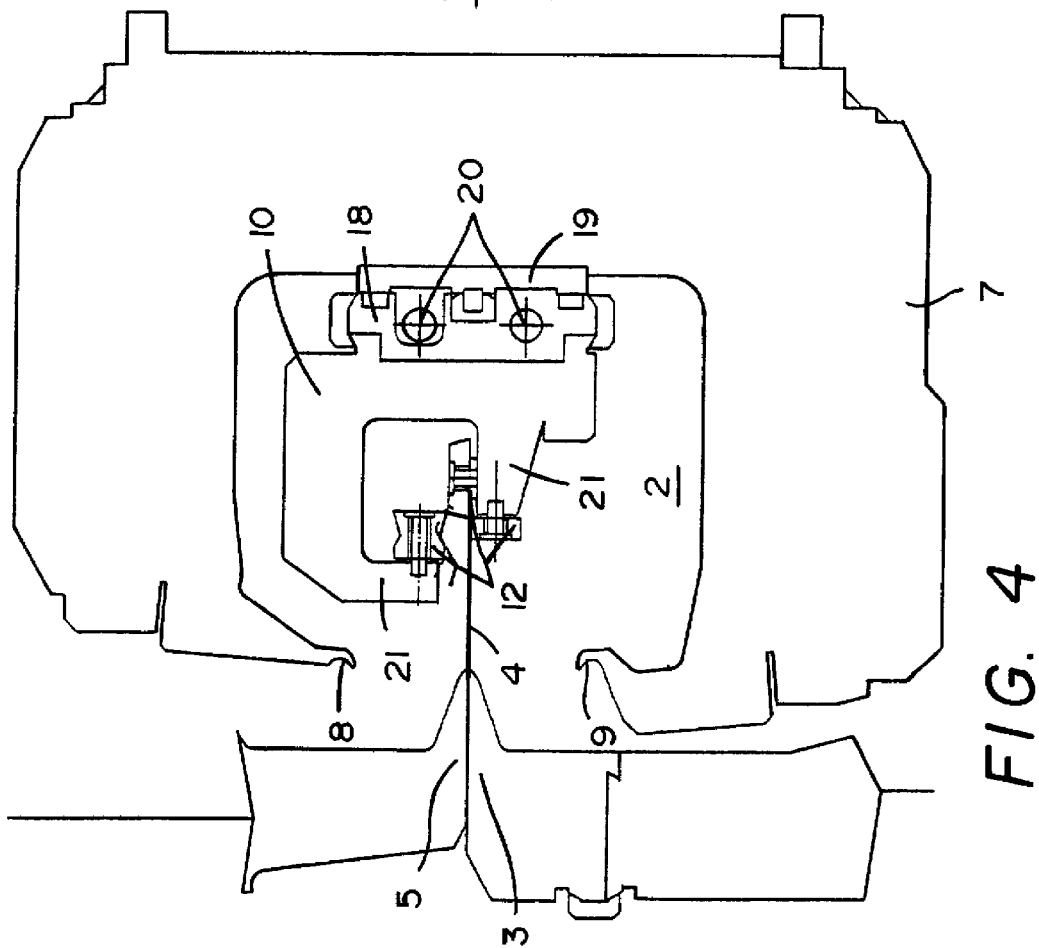

MACHINE USED FOR FOLDING, PROFILING AND CUTTING METAL SHEETS

DESCRIPTION

1. Field of the Invention

The present invention relates to a machine for folding, profiling and cutting (metal)sheets. In particular, the machine in question provides an optimal configuration for folding, profiling and cutting sheets of different thicknesses, sheets of brushed finish stainless steel, or of prepainted sheets, plasticized sheets, etc. These would be uses in which the folding, profiling and cutting of the sheets need to be free of defects and of alterations to paints or protective layers—such as, for example, the production of metallic furniture, covers for household appliances, shelving, etc.

2. Background of Invention

Currently, no machines exist which are capable of executing the three operations of folding, profiling and cutting of the sheet, as noted above.

Instead, there are single machines capable of executing only one of those operations, but with notable operative limitations and disadvantages.

a) The traditional folding machines

For the most part, these machines are constructed in the following way.

They consist of a fixed support structure holding two presser elements: one fixed lower element on which which the sheet to be folded rests, and one upper mobile element which keeps the sheet pressed onto the lower one. To the fixed support structure is associated a mobile structure having a cross section essentially in the form of a C holding two blades, one upper and one lower, both of which execute the folding of the sheet in accordance with the raising or lowering of the mobile structure.

To avoid the formation of defects in the folding area and to be able to execute folds of different angles and rounding of the same angles, a movement of the mobile structure from and toward the sheet to be folded has also been provided for.

One of these machines is described in the European Patent No. 490.828.

However, these machines present some operational limits related to the area of contact between the two presser elements that hold the sheet during the folding operation. The problem is that the width of the sheet to be (re)folded cannot be less than the width of the contact area of the presser elements.

Consequently, one always gets some sheets with a folded edge, but with ample flat surface, which is not always desirable.

Therefore, it becomes necessary to cut the folded sheets on another machine. This obviously is a waste of time, and results in a loss of productivity.

Once cut, the sheet can be returned to the folding machine so that the fold of the cut edge can be performed so as to have, for example, a second profile identical to the first.

In the end, however, there is nonetheless a waste of material that approximately equals to the area of the sheet held between the presser elements.

Another inconvenience (but related to the use of traditional folding machines and guillotine style shears) is attributable to the fact that whenever one desires to perform the folding of a very narrow sheet and afterwards wants to perform the cut on it, a real danger exists for the, who feels constrained to work with his hands in close proximity to the folding and cutting tools.

A final operative limitation of the traditional folding machines is that it is frequently not possible to complete all of the folding operations.

In fact, the overall dimensions of the presser elements do not allow the folding blades to perform folds that are very close and with relatively small angles or, in any case, to attain closed folds.

To do so it is necessary to transfer the sheet from the folding machine to a profiling machine with obvious expense in terms of economics or time.

As an alternative, it is possible to transfer the sheet directly into a profiling machine.

b) The traditional profiling machines

As is well known, such machines utilize a technology that does not render them flexible from the operational point of view.

These machines are essentially constructed of a fixed bench, a few meters long, holding numerous vertical columns, themselves holding various motorized profiling rollers which engage and fold the sheet which corresponds to them.

To modify the folding profile it is necessary to substitute motorized rollers. But this operation, because of the complexity of the machine, ends up being rather long and laborious.

An objective of the present invention is therefore to overcome the inconveniences of the prior art techniques by making available a machine that is cabable of executing the same operations of folding, profiling and/or cutting the sheet with increased productivity, operational precision and hazard preventative safety for the operators.

Another objective is to make available a machine for folding, profiling and cutting sheets that is relatively simple to construct and operate.

BRIEF SUMMARY OF INVENTION

These and still other objectives are all achieved by the machine of the present invention which comprises a fixed support structure holding a lower presser element, on which the sheet is resting, to which is associated an upper mobile presser element, to keep the sheet pressed against the lower presser element in a proper horizontal plane. This machine further comprises a mobile structure having a cross section which is essestially C-shaped and which defines a longitudinally oriented channel. This C-shaped structure holds a pair of folding blades which perform the folding of the sheet when the same C-shaped structure is raised and lowered or made to advance or withdraw with respect to the sheet. At least one removable tool holding group is situated within the interior of the channel, and is of a configuration that permits its repositioning along the longitudinal course of the channel. The tools of the group are provided for performing profiling and/or cutting operations on the sheet being held in position by the upper and lower presser elements.

BRIEF DESCRIPTION OF DRAWINGS

Further characteristics and advantages of the present invention are provided by the detailed description that follows. This description is of a preferred but not meant to be limiting. The preferred embodiment is also illustrated, purely as an example and not for exact specifications, in the attached drawings, in which:

FIGS. 4 and 5 show part of the machine, with a prime demonstrative example of profiling tools, viewed in cross section along the lines IV—IV and V—V, respectively, of FIG. 1.

DETAILED DESCRIPTION OF INVENTION

Figure 1:
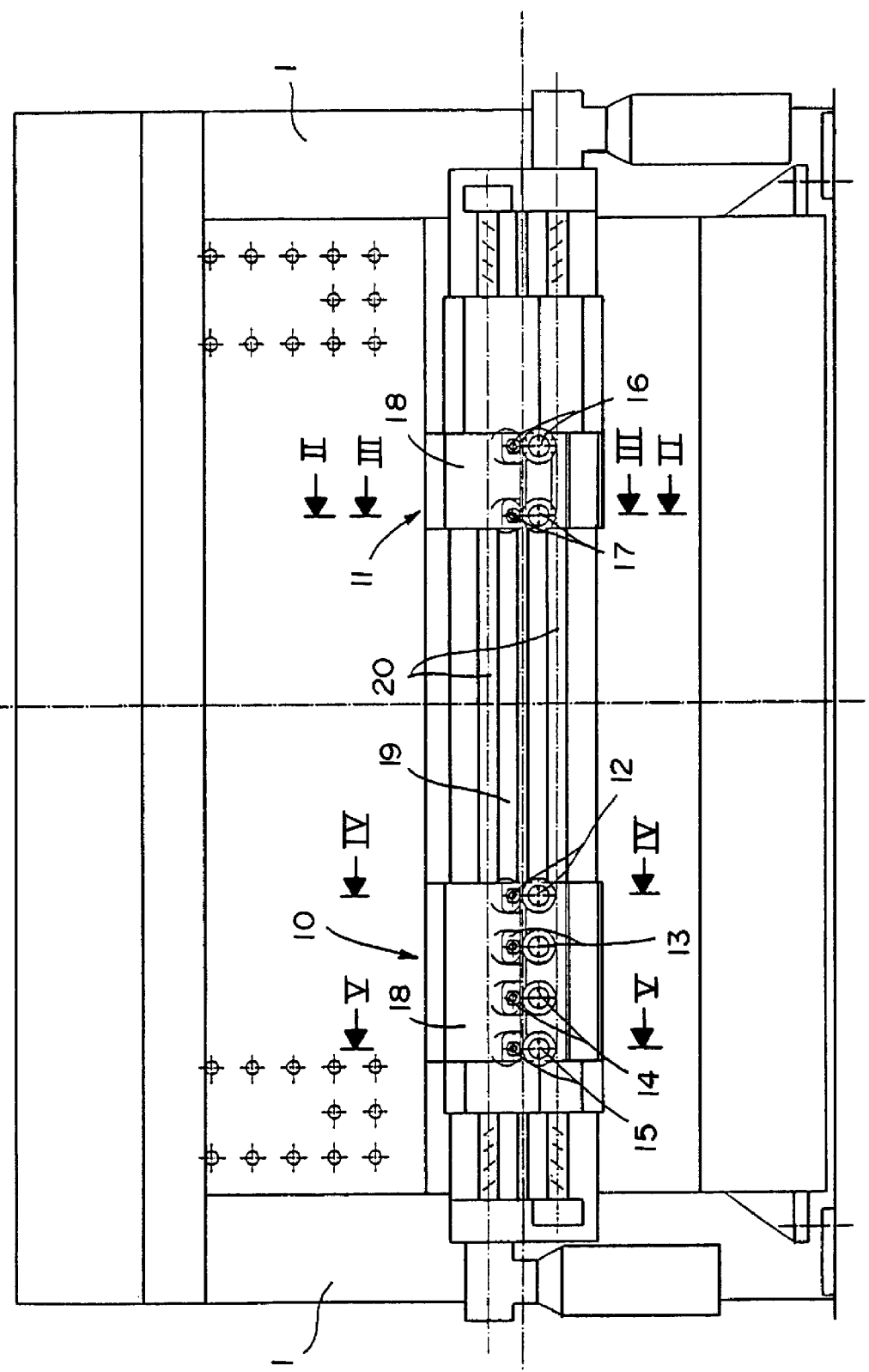
FIG. 1 schematically shows the machine in question viewed from the front, excluding some parts in order to better point out some others.
Figure 2:
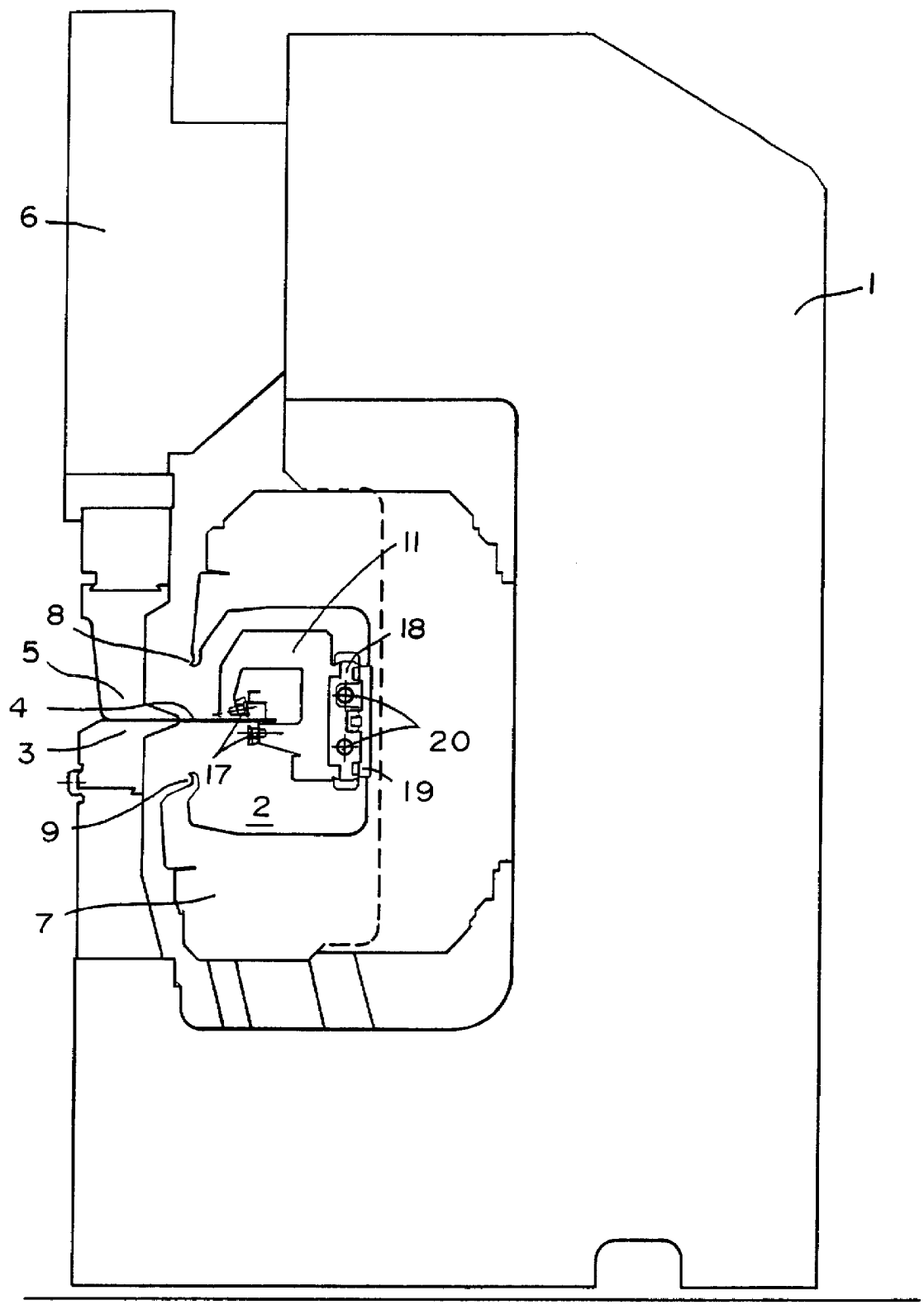
FIG. 2 schematically shows the machine in question viewed in cross section along the line II—II of FIG. 1.

With reference to the attached drawings, a fixed structure 1 has a channel 2 in its interior. Structure 1 carries a lower presser element 3 on which the sheet to be folded 4 rests. Associated with lower presser element 3 is an upper mobile presser element 5 which presses sheet 4 against the lower presser element 3.

Upper presser element 5 is held by a structure 6 connected to the support structure 1 structure 6 enables the repositioning of upper presser element along the vertical plane. Within channel 2 is housed a mobile structure 7 having a cross section essentially in the form of a C. C-shaped structure 9 holds an upper blade 8 and a lower blade 9. Blades 8 and 9 perform the folding of the sheet 4 when along the vertical axis perpendicular to horizontal plane of sheet 4, structure 7 is raised or lowered. In such cases, in fact, blade 8 or blade 9 comes into contact with sheet 4, in proximity to the zone where it extends from elements 3 and 5, thus performing the fold, i.e., upper blade 8 performs the fold or bend toward the bottom, while lower blade 9 performs the fold or bend toward the top.

The raising and lowering of the mobile structure 7 is realized through conventional means, not illustrated. Mobile structure 7 is also capable of moving along the horizontal direction away from and toward sheet 4 by means of a particular drive system that is described, for example, in the aforementioned European patent No. 490.828.

In the interior of the channel 2 are housed two removable tool holding groups 10 and 11 which can be rectilinearly repositioned longitudinally along channel 2. For the exampler embodiment illustrated as for example in the attached drawings, there are two tool holding groups 10 and 11 (but there could also be a different number.

For holding groups 10 there are four (three piece sets of) profiling tools 12, 13, 14, 15. For holding groups 11 there are two (pairs of) cutting tools 16 and 17. Note however that instead of the respective 4 and 3 tools, each holding group may in fact carry most any number of tools. All of these tools perform operations on sheet 4 while it is being held in position by the two presser elements 3 and 5.

Each one of the two tool holding groups 10 and 11 is mounted on a motorized carriage 18, itself mounted on guide rails 19, which are affixed to the interior of the structure 7. Carriage 18 is driven by means of motorized filleted bars (or rods) 20.

Figure 3:
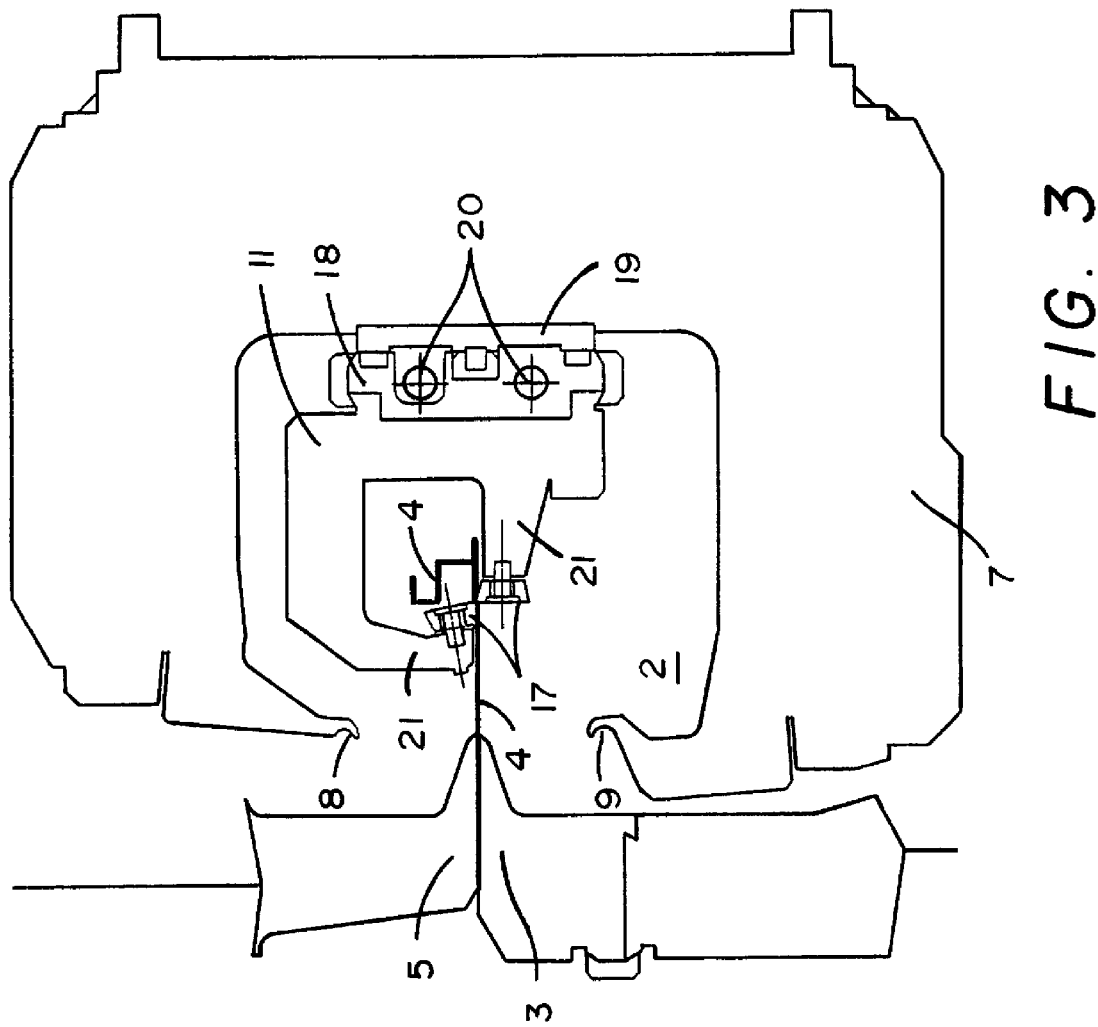
FIG. 3 shows part of the machine viewed in cross section, along the line III—III of FIG. 1.

Each of the tool holding groups 10 and 11 consists of a shaped element, having a mostly longitudinal development, appearing in cross section in the form of a "C" where the end extensions 21 of this C end up approaching one another and are respectively arranged on opposite sides of sheet 4. These extensions 21 hold tools 12–17 as illustrated in FIGS. 3, 4 and 5. With reference to FIG. 3 which shows tool holding group 11, note that tools 16 and 17 held by extensions 21 comprise roller scissors having opposing cutting edges and respectively arranged on opposite sides of the horizontal plane of sheet 4 and in contact with it.

Further note that, per illustration of FIG. 3, roller scissors 16 and 17 each have axes of rotation not parallel to each other.

With reference to FIGS. 4 and 5, which illustrate tool holding group 10, note that tools 12, 13, 14 and 15 held by extensions 21 comprise idle profiling rollers having work surfaces in contact with the sheet 4. The profiles of such work surfaces vary with gradual discontinuity from the first profiling roller 12 to the last profiling roller 15 of group 10 in such a way that the profiling of the sheet 4 gradually takes place.

In the example shown in FIG. 4 and 5, the axes of profiling rollers 12–15 belonging to the same extension 21 (the one represented to the right in the illustration) have a different inclination, with respect to the others in reference to the horizontal plane of sheet 4.

Analogously, there can be profiling rollers 12–15 belonging to the same extension 21 (for example, the one to the left in FIGS. 4 and 5) which show axes parallel to one another.

Note, however, that such axes could also not be parallel. In which case rollers 12–15 (to the left in FIGS. 4 and 5) would execute a gradual profiling of the sheet.

Naturally, innumerable combinations of rollers and variations in their reciprocal position are possible, so that most any kind of profile on sheet 4 could be realized.

Note that, from the point of view of construction and functionality, the machine of the present invention turns out to be very simple, and that translates into obvious economic and operational advantages.

The invention therefore achieves the predetermined goals.

Obviously, the present invention, in its practical manifestation, will also be able to assume forms and configurations different from that which has been illustrated above, without going outside of the present scope of protection because of these differences.

Moreover, all of the parts could be substituted by equivalent elements, and the forms, dimensions and materials used could be adapted to whichever ones are needed depending on the particular needs.

We claim:

1. Machine for folding, profiling and cutting of work sheets comprising:

a support structure;

a lower presser element, onto which a sheet to be worked on rests, coupled to said support structure;

an upper presser element movable with respect to said support structure and working cooperatively with said lower pressure element for maintaining said sheet in a proper horizontal plane;

a mobile structure having a substantially C-shaped cross section including two end tips for defining a longitudinal channel;

a pair of folding blades adaptable for folding said sheet each respectively mounted to one of said end tips when said C-shaped structure is moved along an axis perpendicular to said horizontal plane, said C-shaped structure being movable as a unit;

at least one removable tool holding means situated in the interior of said channel and positionable along the longitudinal axis of said channel; and at least one tool means coupled to said tool holding means for effecting profiling and/or cutting operations on said sheet held in position by said upper and lower presser elements.

2. Machine according to claim 1, wherein said tool holding means is mounted to a motorized carriage for movements substantially in parallel to the horizontal plane of said sheet along the longitudinal direction within said channel.

3. Machine according to claim 2, wherein said at least one tool means coupled to said tool holding means comprises cutting tools which, in combination with the movements of said carriage, effect cutting of said sheet.

4. Machine according to claim 2, wherein said at least one tool means coupled to said tool holding means comprises at least one profiling tool which, in combination with the movements of said carriage, effect profiling operations on said sheet.

5. Machine according to claim 1, further comprising:
a plurality of tool holding means;
wherein at least one of said tool holding means is equipped with cutting tools; and
wherein at least one other of said tool holding means is equipped with profiling tools.

6. Machine according to claim 1, further comprising:
a plurality of tool holding means;
wherein the tools of at least two of said tool holding means are profiling tools.

7. Machine according to claim 2, wherein said tool holding means mounted to said motorized carriage comprises a longitudinal element having a substantially C-shaped cross section including end projections each having at least one tool respectively arranged on opposite sides of the horizontal plane of said sheet.

8. Machine according to claim 7, wherein the tools held by said end projections comprise roller scissors with opposing cutting edges, said tools being respectively arranged on opposite sides of the horizontal plane of said sheet and in contact therewith.

9. Machine according to claim 8, wherein said roller scissors have respective axes of rotation each not parallel to the other.

10. Machine according to claim 7, wherein said end projections each having attached thereto a plurality of tools, said tools being idle profiling rollers each having a work surface in contact with said sheet, the profiles of said idle profiling rollers vary from the first profiling roller to the last profiling roller so that the profiling of said sheet can be effected gradually.

11. Machine according to claim 10, wherein the axes of the profiling rollers held by the same end projection all have the same inclination with respect to the horizontal plane of said sheet, the profiles of the work surfaces of said profiling rollers varying from one to the other.

12. Machine according to claim 10, wherein the axes of the profiling rollers held by the same end projection have different inclinations each with respect to the other in reference to the horizontal plane of said sheet.

13. Machine according to claim 2, wherein said carriage is movably mounted on guide rails affixed to one of the internal walls of said channel, said carriage being driven by motorized means.

14. Machine adaptable for performing more than one type of operation on a work sheet, comprising:
a support;
upper and lower presser elements working cooperatively with each other for holding said work sheet along a horizontal plane;
a C-shaped cross sectional frame having mounted to the end tips thereof respective blades for effecting bends on said work sheet when said C-shaped frame is moved along an axis perpendicular to said horizontal plane, said C-shaped frame being movable as a unit;
at least one tool holding means positioned within the channel defined by said C-shaped frame; and
tool means mounted to said tool holding means for effecting at least profiling and/or cutting operations on said sheet independent of the movements of said C-shaped frame.

15. Machine of claim 14, wherein said tool holding means is positionable longitudinally along the channel defined by said C-shaped frame so that said sheet is worked on by any tool mounted thereto.

16. Machine of claim 14, wherein there are multiple tool holding means positioned within the channel defined by said C-shaped frame, each of said tool holding means being adaptable to carry profiling and/or cutting tools.

17. Machine of claim 14, wherein said tool holding means is movably mounted on guide rails extending along said channel, said tool holding means being driven by motorized means.

18. A method of performing more than one type of operation on a work sheet held along a horizontal plane by upper and lower presser elements working cooperatively with each other, said upper and lower presser elements being supported by a frame, the method comprising the steps of:
mounting to end tips of a C-shaped cross sectional frame supported by said frame and movable vertically relative to said upper and lower presser elements respective blades for effecting folds on said work sheet when said C-shaped frame is moved as a unit along an axis perpendicular to said horizontal plane;
positioning at least one tool holding means within the channel defined by said C-shaped frame; and
mounting tool means to said tool holding means for effecting at least profiling and/or cutting operations on said sheet independent of the movements of said C-shaped frame.

19. Method of claim 18, further comprising the steps of:
movably mounting said tool holding means on guide rails extending along said channel; and
driving said tool holding means longitudinally along said channel to effect operation on said work sheet.

* * * * *